(12) United States Patent
Queveau et al.

(10) Patent No.: US 7,296,843 B2
(45) Date of Patent: Nov. 20, 2007

(54) VEHICLE COMPRISING A VERTICALLY FOLDING SUN ROOF

(75) Inventors: Gérard Queveau, Le Pin (FR); Paul Queveau, Montravers (FR); Jean-Marc Guillez, Cirieres (FR)

(73) Assignee: Society Europeene de Brevet Automobiles, Paris (FR)

( * ) Notice: Subject to any disclaimer, the term of this patent is extended or adjusted under 35 U.S.C. 154(b) by 0 days.

(21) Appl. No.: 10/558,969

(22) PCT Filed: Jun. 16, 2004

(86) PCT No.: PCT/FR2004/001494

§ 371 (c)(1),
(2), (4) Date: Jan. 27, 2006

(87) PCT Pub. No.: WO2004/113107

PCT Pub. Date: Dec. 29, 2004

(65) Prior Publication Data

US 2007/0024081 A1    Feb. 1, 2007

(30) Foreign Application Priority Data

Jun. 17, 2003   (FR) .................................. 03 07282

(51) Int. Cl.
B60J 10/10   (2006.01)
(52) U.S. Cl. ................................. 296/107.17
(58) Field of Classification Search ........... 296/107.17, 296/107.18, 107.16, 107.19, 107.2, 107.08
See application file for complete search history.

(56) References Cited

U.S. PATENT DOCUMENTS 2,812,975 A * 11/1957 Warner ....................... 296/117
4,729,592 A * 3/1988 Tuchiya et al. ......... 296/107.16
4,776,630 A * 10/1988 Fukutomi et al. ...... 296/107.17
4,796,943 A * 1/1989 Fukutomi et al. ...... 296/107.17
5,746,470 A * 5/1998 Seel et al. ................... 296/108

(Continued)

FOREIGN PATENT DOCUMENTS

EP        0764553         3/1997

(Continued)

*Primary Examiner*—Kiran B. Patel
(74) *Attorney, Agent, or Firm*—Harness, Dickey & Pierce, PLC

(57) ABSTRACT

Disclosed is a vehicle with a removable top, comprising a stowable rigid roof that is provided with a forward roof element (15) and a rear roof element (17), a stowing space for the roof, which is located between the seats and the rear hood of the vehicle, first displacement means (35) for moving the roof elements side by side when the roof is opened, and second pivoting means (37, 43, 47) for displacing the roof elements by pivoting said roof elements between the closed state of the roof in which the elements are arranged in a substantially horizontal direction and the open state of the roof in which the elements are disposed in an essentially vertical direction within the stowing space. The movements to which the roof is subjected are coordinated such that the forward roof element (15) moves underneath the rear element until being positioned next to said rear element while the pivoting means pivot the rear element and simultaneously entrain the forward element with the aid of the displacement means (35), said pivoting means being connected exclusively to the rear roof element (17) on one side and to the chassis frame (21) of the vehicle on the other side.

6 Claims, 6 Drawing Sheets

U.S. PATENT DOCUMENTS

Figure 1:
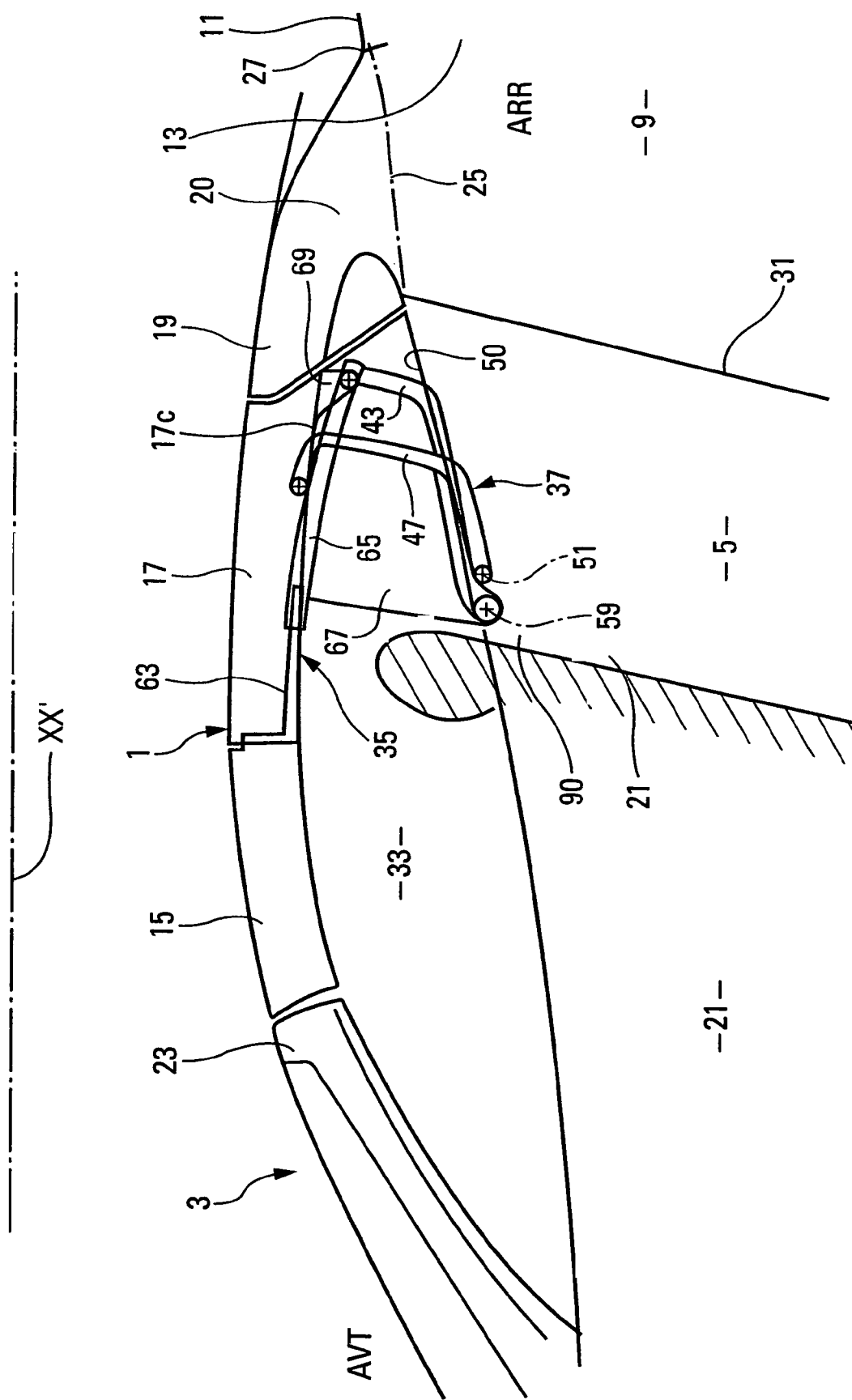

| | | | |
|---|---|---|---|
| 5,979,970 A * | 11/1999 | Rothe et al. ............ | 296/107.17 |
| 6,312,042 B1 * | 11/2001 | Halbweiss et al. ..... | 296/107.17 |
| 6,347,828 B1 * | 2/2002 | Rapin et al. ........... | 296/107.17 |
| 6,431,636 B1 * | 8/2002 | Schutt ................... | 296/107.17 |
| 6,467,832 B2 * | 10/2002 | Schutt et al. .......... | 296/107.17 |
| 6,866,325 B2 * | 3/2005 | Willard ................. | 296/107.17 |
| 2002/0060471 A1 | 5/2002 | Bergerhoff et al. | |

FOREIGN PATENT DOCUMENTS

| | | |
|---|---|---|
| EP | 0844125 | 5/1998 |
| EP | 1065085 | 1/2001 |
| FR | 2854353 A1 * | 11/2004 |
| FR | 2857626 A1 * | 1/2005 |
| WO | WO 2004096591 A2 * | 11/2004 |
| WO | WO 2005007433 A2 * | 1/2005 |
| WO | WO 2005012017 A2 * | 2/2005 |

* cited by examiner

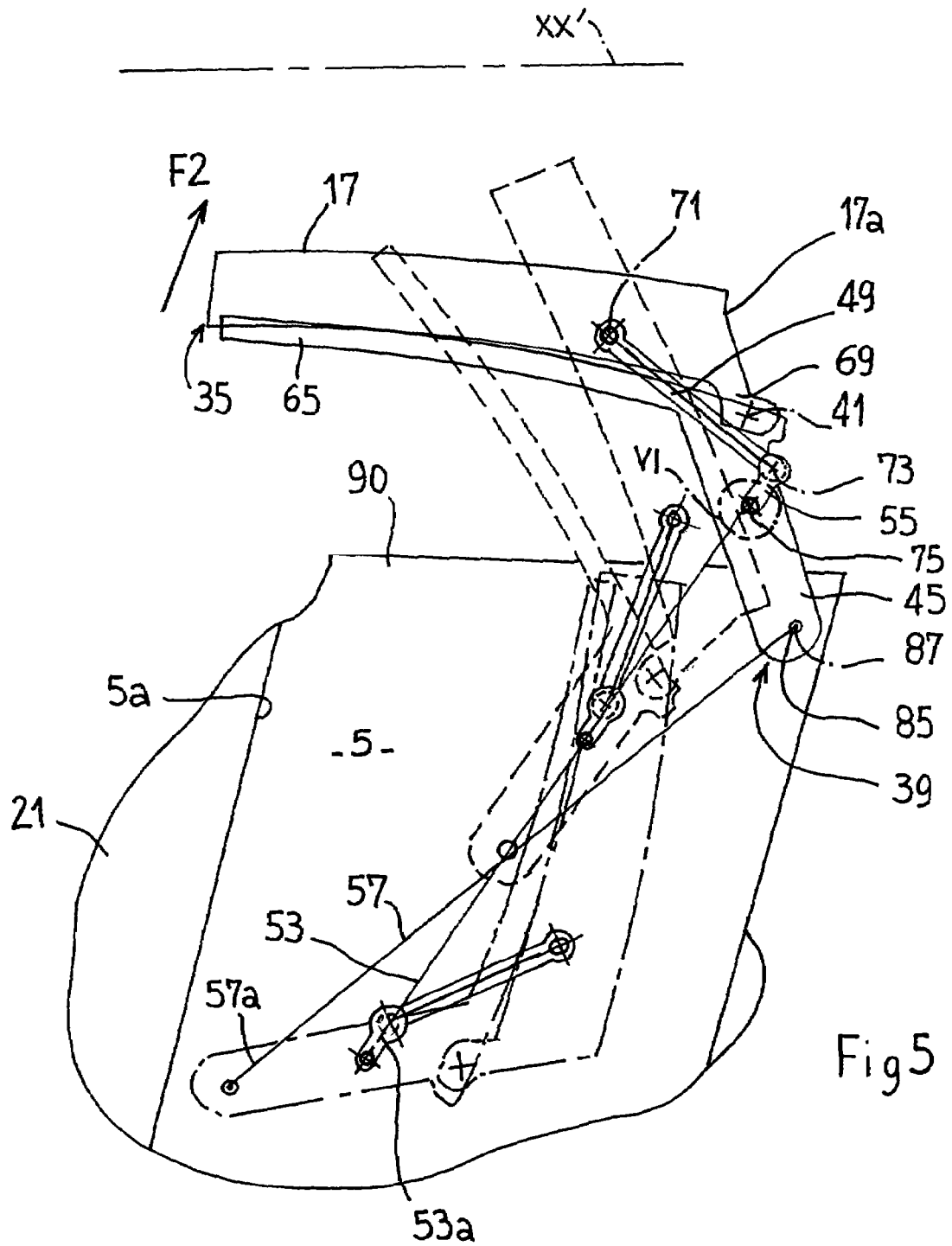

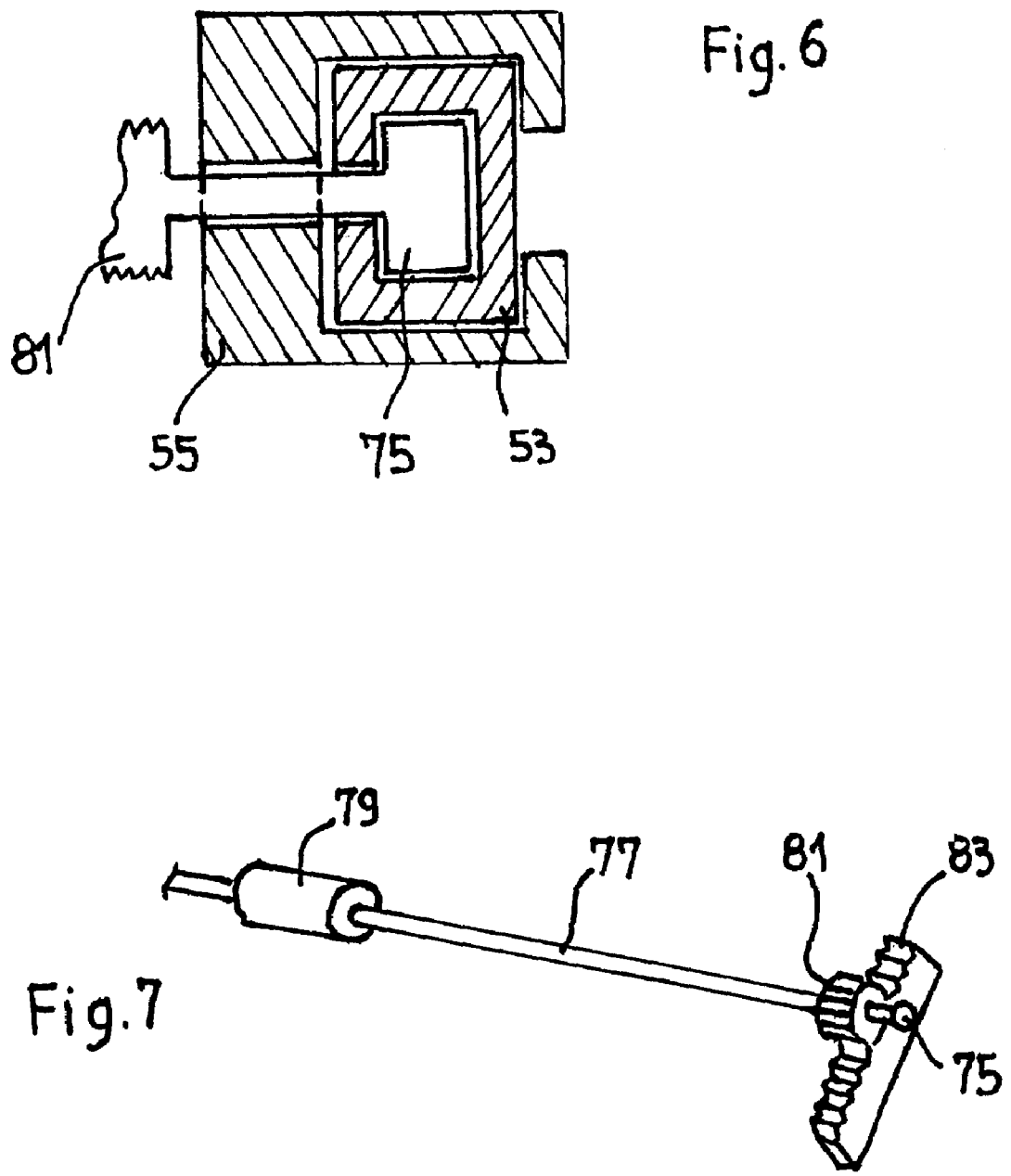

VEHICLE COMPRISING A VERTICALLY FOLDING SUN ROOF

The invention relates to a convertible vehicle with a rigid, retractable roof, in several sections.

Such vehicles are already known.

Thus, in particular a convertible vehicle is known with a longitudinal axis, a front and a rear, and comprising:
- a structure;
- a passenger compartment fitted with seats;
- a retractable rigid roof, movable between a closed state above the passenger compartment and an open state in which the roof is stowed behind the seats, the roof comprising a first roof element and a second roof element located behind the first roof element, in the closed roof state.

If the rear area, typically designed on numerous vehicles to stow the roof in its folded state, is unavailable to hold this roof (for example, because it is used to house the engine), another area needs to be found to stow the roof.

In terms of space, this problem is complicated due to the limited space available to stow the roof, problem linked to a lack of space, in particular along the longitudinal axis of the vehicle.

Under these conditions, it is envisaged in the invention fitting the vehicle so that it comprises, in addition to the aforementioned elements:
- a roof stowage space in its open state, the space being located between the seats and the rear area of the vehicle;
- first displacement means to bring the first and second roof elements side by side, during the opening of the roof;
- and second tipping means to displace, via pivoting, the first and second roof elements between said closed roof state in which these elements are placed substantially horizontally and the open roof state in which said elements are stowed substantially vertically in the stowage space.

In particular when the roof stowage space is restricted in size and furthermore it is desired that the roof displacement control means interfere as little as possible with the passenger compartment (notably in this case the second tipping means), the kinematics of the roof and the site of these control means must be cleverly defined. Thus, the invention recommends that the movements applied to the roof via the first displacement means and the second tipping means are coordinated so that the first roof element passes under the second roof element until it comes along side it, whilst the second tipping means, connected on one side to the roof elements and on the other side to the bodywork of the vehicle, pivot this second roof element while bringing the first roof element with it.

Incidentally, within the invention it is preferred that the second tipping means are placed towards the rear end of the second roof element, providing a relative articulation between them and a drive connection (traction) in relation to the first roof element, via rods (runner system notably passing under the second roof element).

Stowing the roof in its stowage space, along a radius of curvature which evolves according to the folded state of this roof, allows to house the latter in a particularly narrow space in the direction of the longitudinal axis of the vehicle.

In line with this approach, the invention therefore recommends that the second roof element is connected, towards the rear and in an articulated manner, to the second tipping means which, in a movement in relation to the bodywork of the vehicle, drive said roof elements along a curvilinear displacement, with a concavity oriented towards a zone located in the vicinity of the upper front edge of the stowage space.

Within the context of the aforementioned kinematics of the movements of the roof, the invention specially attempted to finding a compromise between the "fluidity" of the movement, the non-interference with the passenger compartment, the reliability of the chosen mechanical solution and a tipping over that must be quick and of limited amplitude so that the roof moves from its substantially horizontal closed position to its substantially vertical folded position.

Under these conditions, another feature of the invention recommends that, laterally, on each side of the roof, the second roof element and the second tipping means articulate on each other along two axes in a direction transversal to the longitudinal axis of the vehicle, respectively via first and second guiding means each bearing an end extending as far as a zone of the bodywork of the vehicle located in the vicinity of the front edge of the roof stowing space, said ends, between each other, and said transversal axes, between each other, being respectively offset along the longitudinal axis of the vehicle, so that the displacement towards the rear and downwards of the roof, induced by the guiding means, provoke a vertical offset between the front edge of the second roof element and the rear edge of the first roof element, prior to an action by the first displacement means to bring the first and second roof elements side by side, during the folding of the roof.

In the same context, it is furthermore recommended that:
- the second tipping means comprise at least a first arm and a second arm;
- the first arm is on one side solidly connected to the first roof element and is connected in an articulated manner to the second roof element to allow a relative pivoting about an axis transversal to the longitudinal axis of the vehicle;
- the first arm is on the other side assembled in an articulated manner in relation to the bodywork of the vehicle; and
- the second arm is connected in an articulated manner, on one side, to the second roof element and, on the other side, to the bodywork of the vehicle.

Therefore, whilst they can advantageously comprise such first and second arms, the roof tipping means will be advantageously associated, in the invention, to sliding runners, and this even though a purely twin articulated arm solution (preferably extending between the rear of the second roof element and an upper front zone of the stowage space) is also described below.

The solution with arms individually assembled in a double runner is preferred to a twin articulated arm system, in that it favours the speed at which the roof pivots and best satisfies the aforementioned space limitation conditions.

Also to be noted is that the invention is of particular benefit to vehicles with trunk rear lid and rear mounted engine, therefore comprising a rear lid articulated on the bodywork and located behind the seats, towards the rear of the vehicle, to provide access (possibly in addition to a luggage stowage space) to a rear mounted engine naturally used to displace the vehicle. Notably, in this case, there are space limiting problems, here for access to the engine, even for access to the inside of the stowage space for the folded roof.

Figure 2:
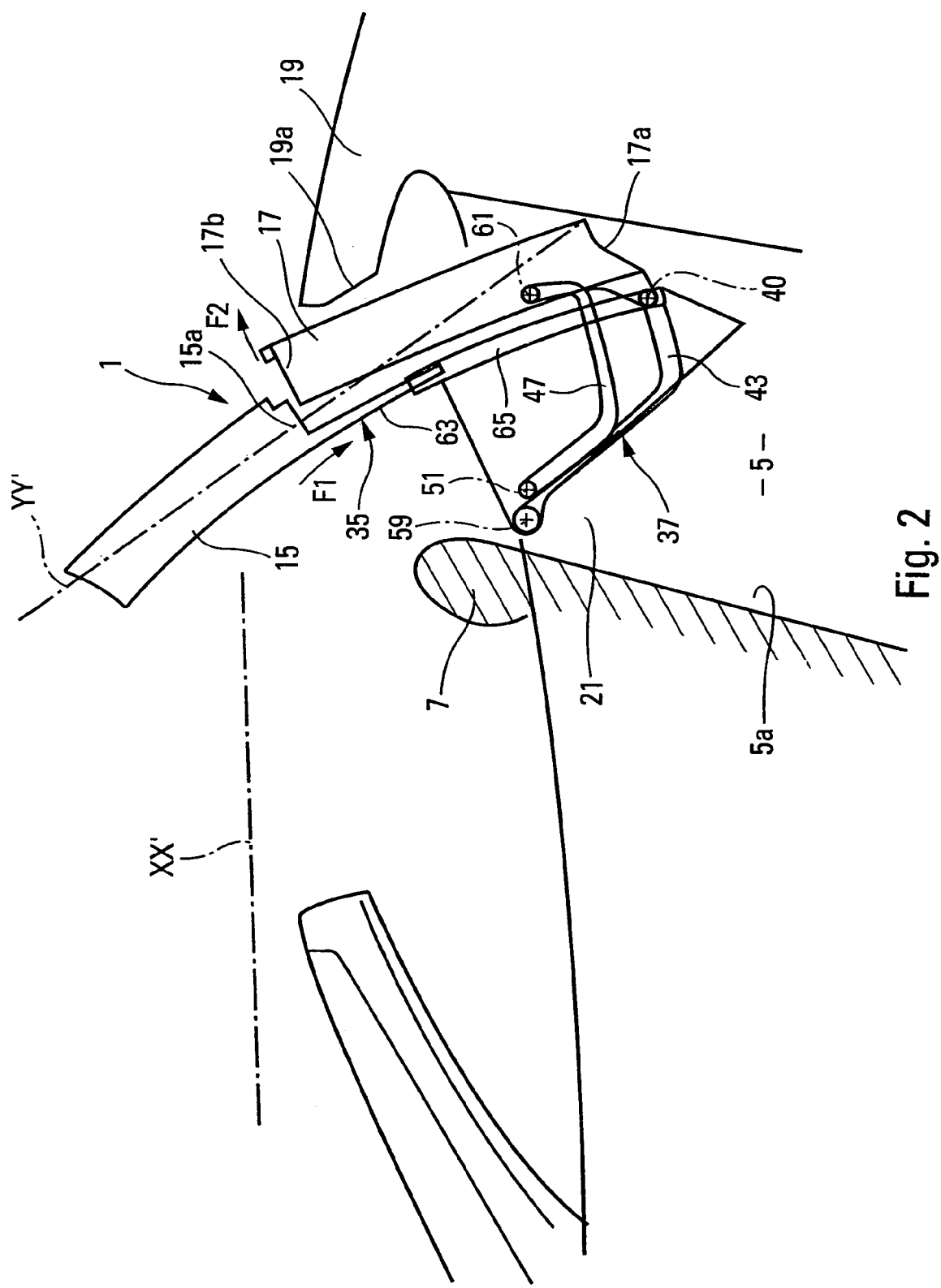
Figure 3:
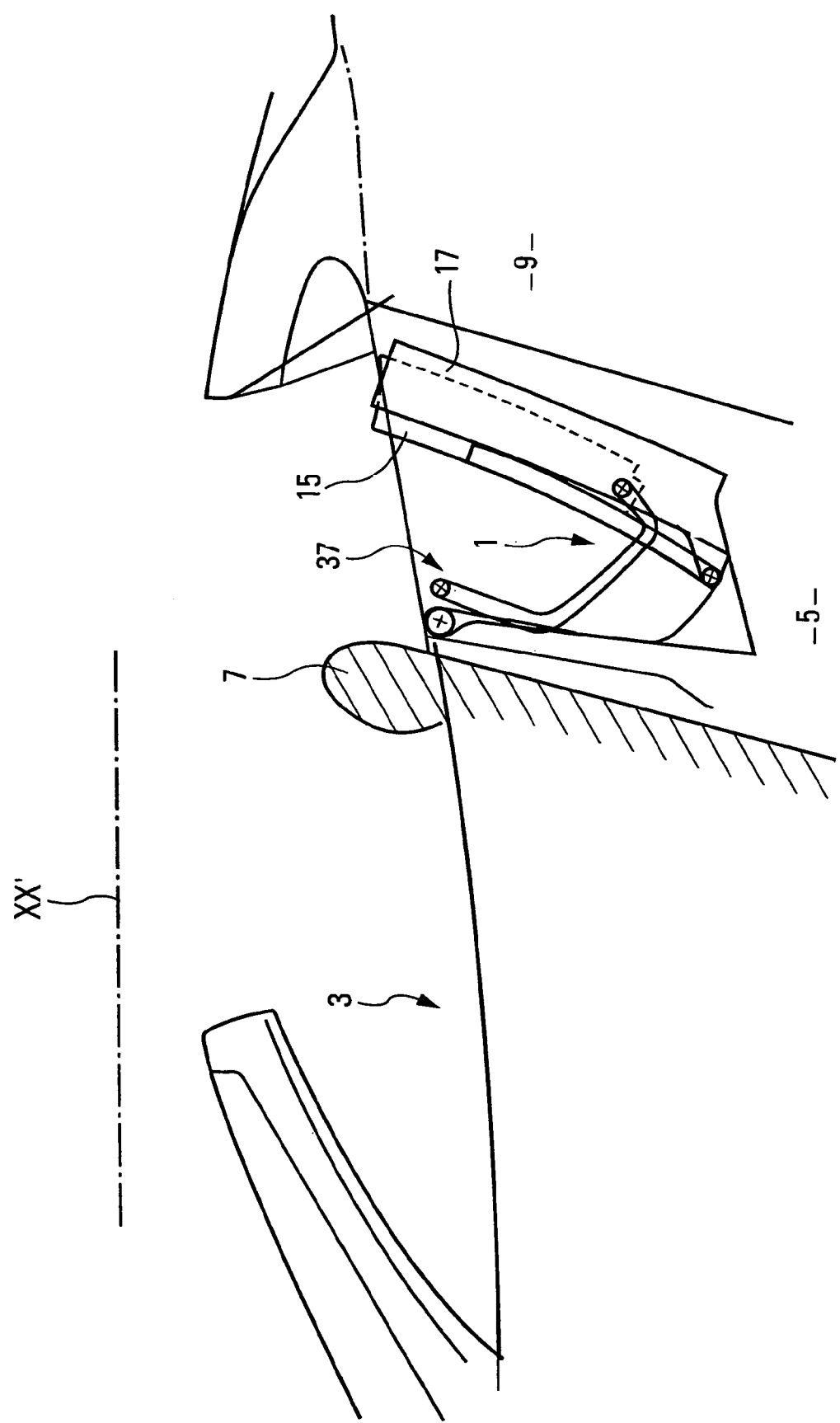
Figure 4:
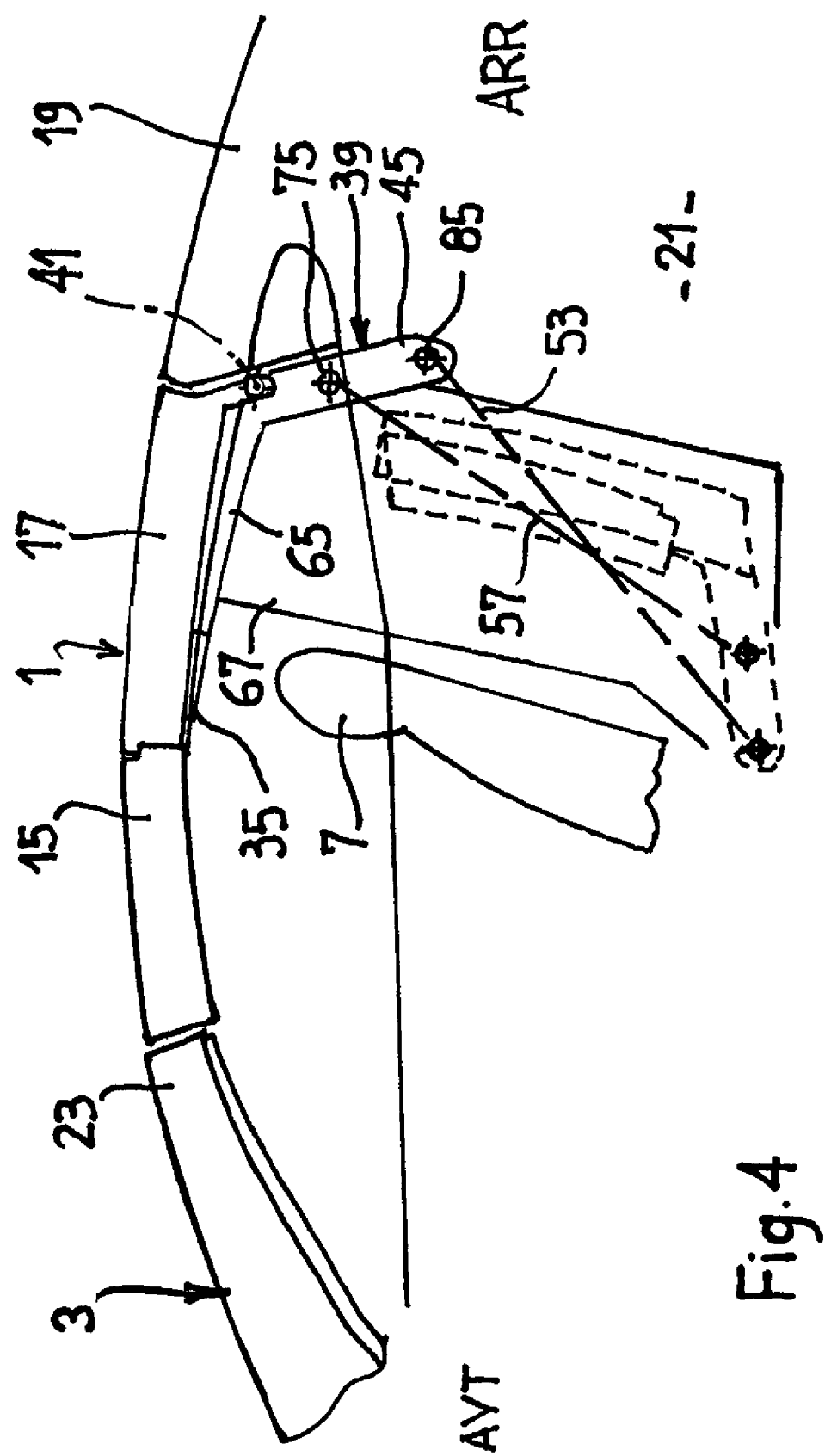

Other features and advantages of the invention will still emerge from the additional description that follows, in which:

FIGS. 1, 2 and 3 show a first mechanism to turn the vehicle into a convertible in association with three successive steps of folding the roof into its stowage space;

FIGS. 4 to 7 make reference to a second embodiment referring to a roof tipping mechanism via runners, FIGS. 4 and 5 diagrammatizing the kinematics of the main parts in motion, whereas FIG. 6 shows in cross-section, in greater detail, the sliding connection in the vicinity of the zone marked VI in FIG. 5, and that FIG. 7 diagrammatizes a possible motorized driving system at this location, for sliding movement in the runners.

The two preferred embodiments of the invention described below therefore allow, with a retractable roof 1, to transform a saloon or coupe type vehicle 3 into a convertible type vehicle.

The problem encountered in the existing solutions to retract the roof being that they generally do not allow to stow the latter in a particularly limited space 5 notably in the direction of the longitudinal axis XX' of the vehicle, when this space is interposed between the rear of the passenger seats 7 and the front of the zone 9 of the vehicle notably reserved for the rear lid 11 under which the engine 13, intended to displace the vehicle, is usually housed, the invention has envisaged a roof whose tipping mechanism resolves these problems of limited space.

In the following solutions, the described mechanisms are substantially symmetrical in relation to the median plane of the vehicle (containing XX'). Thus only the solution of one side will be disclosed.

In the two illustrated embodiments notably in FIGS. 1 and 4, the roof 1 of the vehicle comprises, from the front (AVT) towards the rear (ARR), three successive rigid sections 15, 17 and 19. The two more forward sections 15 and 17 constitute first and second movable roof elements or panels, whereas the rear section 19 is fixed with respect to the bodywork 21 of the vehicle ("bodywork" is used for any part of the chassis and/or the body of the vehicle and which constitute support or reference parts in relation to which the roof 1 is movable).

Thus, the two elements 15 and 17 of the roof 1 are interposed, in this example, between, at the front, the windscreen opening 23 and, at the rear, the fixed section 19 which integrates the lateral rear struts 20 which surround a rear window which is not visible in the figures and which thus extends between these struts.

The two movable elements 15 and 17 of the roof 1 are therefore substantially plane and positioned substantially horizontally in the closed state of the roof as illustrated in FIG. 1.

Note that the rear movable section 17 of the roof can all the same extend further backwards and integrate in it the section 19 so that this pivoted assembled rear element will thus extend as far as the zone 25, 27 in FIG. 1. Of course, the rear limit here marked by 31 in FIG. 1 (substantially at the level of the front part of the roof element 19) in this case extends backwards as far as to the level of the point 27.

So as to pivot between its closed state above the passenger compartment 33 (FIGS. 1 and 4) and its folded state, retracted into its stowage space 5 (FIGS. 3 and 5; chain dotted line), the movement of the movable roof elements 15 and 17 is directed and controlled by the first displacement means 35 and the second tipping means (37 in FIGS. 1 to 3 and 39 in FIGS. 4 and 5). Respectively, these means are intended to bring the first and second roof elements side by side, when the roof is being opened (see FIGS. 2 and 5), and to make them tip over between the closed and open states, resulting in that, in this case, these elements are positioned substantially vertically in the stowage space 5.

In the space 5, the two elements 15 and 17 are positioned side by side (one behind the other). To achieve this it was preferred that, during the folding of the roof, the front element 15 passes under the rear element 17 (arrow F1 in FIG. 2) following a vertical offset between them (arrow F2). This offset movement between the rear edge of the front element 15 and the front edge of the rear element 17 is obtained, in the two embodiments, via an articulated assembly of the rear roof element 17 (marked 40 in FIGS. 2 and 41 in FIG. 5) in relation to an arm (43, 45) connected on one side to the front roof element 15 and on the other side to the bodywork 21, and via the complementary presence of a second arm (47 in FIGS. 2 and 49 in FIG. 5) mounted articulated on one side to the element 17 and on the other side again in relation to the bodywork 21 ("direct" articulation at the place of the transversal axis 51 for the solution in FIG. 2, and "indirect" articulation in particular via the sloping runner 53 in which the arm 49 is driven via, if necessary, the rod 55, in FIG. 5).

In the two embodiments, it is to be noted that the combined effect of offset along F2 and tipping of the roof elements is all the more efficient as the tipping means 37, 39 articulate on one side towards the rear of the rear roof element 17 and, on the other side, towards the front edge 5a of the stowage space 5 (upper section of this edge in the first embodiment and lower section in the second embodiment consisting in the ends 53a, 57a of the two runners 53 and 57).

Also in connection with this tipping coupled with the offset of the roof elements along the F2 direction, it is to be noted in FIG. 2 the forward position, at the place of the articulation on the bodywork, of the axis of rotation 59 of the rear arm 43 in relation to the axis of rotation 51 of the front arm 47 (whose axis of rotation 40, 61 on the element 17 moreover inverse). In FIG. 5, it is to be seen the same offset along the longitudinal axis XX' for the limit ends of the arm 49 in the runners 53 and 57.

The use of such "double" guiding means (double arm 43, 47 in FIG. 2 and double runner system 53, 57 guiding the arms 45 and 49 in FIG. 5) allows to efficiently and accurately guide the movable roof elements in their confined tipping between the closed horizontal position and the folded vertical position.

In relation to this particularly confined pivoting, it is to be noted the relatively tapered shape of the rear edge 17a of the rear element 17, this shape being complementary with that of the front edge 19a of the section 19 of the bodywork of the vehicle. More precisely, in this case it has a tapered shape, bevelled towards the rear and the bottom in order to facilitate the tipping in the same direction of the element 17 during tipping of the roof.

As regards the connection between the respectively rear 15a and front 17b edges of the elements 15 and 17, such a shape does not seem to be essential, as long as the pivoting along F2 is effected substantially perpendicularly to the overall sliding direction YY' of the elements 15 and 17 in relation to each other.

In the figures, this relative movement between the two movable roof elements 15 and 17, along the direction YY', is performed via a bar 63 (slide) prolonging the front roof element 15 substantially along XX' (when the roof is closed as in FIG. 1), in liaison with a co-operating runner 65 extending substantially in the same direction, in the same roof state.

In practice, the orientation of the elements 63 and 65 and their curved shape will be a function of the line of the vehicle (in particular that of its roof zone) and of the surrounding parts such as 19 and 23.

Still in the closed state of the roof, the slide 63, which is firmly attached to the element 15, prolongs it to the rear, under the element 17 where it engages into the runner 65 which is, towards the rear of this element 17, prolonged by (or firmly attached to) either the arm 43 (first embodiment) or to the arm 45 (second embodiment).

Such a slide/runner system, combined with the aforementioned tipping means 37 or 39 positioned to tilt the rear element 17 in relation to the front element 15 of the roof as from the start of the roof opening phase, promotes, in connection with the aforementioned shapes 17a and 19a, the fast tipping towards the rear and downwards of the element 17, during the opening of the roof. In this example, the parts 63 and 65 act as draw rods (or elements) thanks to which the tipping of the rear roof element 17, under the effect of the tipping means 37, provokes the tipping of the front element 15.

Before presenting the opening movement of the roof in the context of the first embodiment in FIGS. 1 to 3, it is to be noted that in this embodiment, the tipping means 37 hardly encroaches on the stowage space 5, as in the closed position in FIG. 1, they show, for the rear arm 43 which is firmly attached to the rear end of the straight runner 65, a "L" shape pivoted to the left, and, for the second articulated arm 47, a "C" shape also pivoted to the left, each having a lower substantially horizontal strand articulated to the bodywork 21, respectively at 51 and 59, close to the upper edge of this bodywork, that is in the vicinity of the upper limit 5b of the space 5, from which limit a lateral rear strut window 67 can typically rise. In this regard, this window can indifferently, in the context of the opening/closing movement of the roof 1, either be pivotally assembled with the tipping means 37 (for example by articulating about the transversal axis 59) or descend by vertically retracting into the bodywork.

It is also to be noted that the articulation axes of the pivoting arms 43, 47 (at 40, 51, 59 and 61) are transversal (more precisely perpendicular) to the longitudinal axis XX' of the vehicle.

The arm 43 (rear arm in fact) is preferably positioned and shaped to act as the driving arm, that meaning that it initiates the tipping opening of the roof. It is at its axis of articulation 40 that the rear roof element 17 is moreover pivotally assembled, via an outgrowth 69 located at the lower rear end of the element 17 and extending substantially vertically (FIG. 1).

The articulation point 61 is located slightly further forward and upward, directly on the element 17.

Due to its assembly and shape, the second arm 47 is the trailing arm and it is in particular via it that the rear roof element 17 slopes along F2 to allow the front element 15 to pass by.

Thus, when the roof elements 15 and 17 pivot backwards, to move from the closed position in FIG. 1 to the open position in FIG. 3, the arm 43 drives the runner 65 backwards and downwards via the pivoting of the arm about the transversal axis 59. The bent arm 47 thus also pivots backwards, provoking the upward tipping of the rear roof element 17 (arrow F2), via the pivoting about the axis 61, thus allowing the slide 63, followed by the element 15, to slide under the beam of the rear element 17, along the runner 65.

The entire under/before movement of the element 15 in relation to the rear element 17, which therefore starts once the roof 1 has started to tip over about axes 51 and 59, and which continues to move as can be seen in FIG. 2, ends when the roof attains its stowed position in FIG. 3, position in which the two elements 15 and 17 are therefore side by side, the element 15 entering into the relative concavity facing forwards of the element 17, in front of it.

When the elements reach this completely folded position of the roof inside the space 5, the element 17 has returned to its normal "non sloping" position which it occupies when it is aligned with the front element 15, thus preventing its upper end from taking up too much space towards the rear.

To ensure the movement of the first and second guiding means 43, 47, as well as the movement of the roof element 15 under the element 17, known drive means can be used, such as power cylinders or electric motors (not represented).

Looking now more precisely at the second embodiment in FIGS. 4 and next ones, it is to be noted that the arm 45 attached to the front roof element 15 rigidly prolongs, backwards and in a bent manner downwards, the runner 65 in the closed state of the roof in FIG. 4.

As for the articulation along the transversal axis 41 of the rear element 17 in relation to this arm 45, it takes place at the rear end of the runner 65 at the uppermost part of the arm 45, at the place of an outgrowth 69, as in the case in FIG. 1.

Incidentally, the articulation of the same element 17 in relation to the arm 49 (FIG. 5) also operates as in the first embodiment, that is at the rear section of the element 17, the transversal axis 71 (therefore perpendicular to XX'), about which the arm 49 is therefore pivotally assembled on the element 17, being located further forward and preferably slightly higher than the transversal axis 41, so that the second arm 49 constitutes (in the image of 47 in relation to 43) the trailing arm in relation to the leading arm 45, during the opening of the roof.

Given the shape of the parts and the kinematics in question, the arm 49, which will in particular be used to pivot the element 17 to allow the element 15 to pass under it, is coupled to the rod 55, via an intermediary articulation on a transversal axis 73, the rod 55 sliding along the runner 53, via a slug 75, as can be seen in FIG. 6.

From this figure and from FIG. 7, it is moreover to be noted that this slug 75 here crosses the rod 55 (with slight clearance to allow the free movement of the rod 55 when moving along 53) and is located at one end of a cross shaft 77 (perpendicular to the axis XX') which, driven by a motor 79, drives a pinion 81 interposed between the shaft and the slug 75 and geared to a rack 83, in order to therefore ensure the displacement in both directions along the runner 53.

A comparable drive can be envisaged at the place of a slug 85 which can freely move inside the other runner 57 and which is assembled towards the free end of the arm 45 along an axis 87 perpendicular to XX'.

Notably in FIG. 5, it is to be noted that, from the top to the bottom of the arm 45, are successively found the articulation axes or slugs 41, 75 and 85, all three substantially aligned along the overall direction of extension of this arm (close to the vertical in the closed position of the roof). Thus, the slug 85 by means of which the leading arm 45 will initiate the tipping of the roof, is located further downwards and backwards in relation to the slug 75 of the trailing arm 49.

The two runners 53 and 57 are in a straight line, sloping (in this case along different angles) and extend between the upper rear end of the stowage space 5 (even from slightly above this space), in the direction of a zone located towards the lower front section of the space.

Combined with the shape of the parts (in particular the roof elements and the arm 45), the longitudinally offset position (along the axis XX') of the lower front ends 53a and 57a of the two runners promotes a short tipping and a fast vertical positioning of the roof elements (chain dotted line in FIG. 5).

In FIG. 6, it is also to be noted the benefit of the articulation 73 of the arm 49 which, in this embodiment, defines a connection rod comprising two rods articulated to each other, the relative position of these two rods developing with the folding movement of the roof (of course, this is also the case for the opposite movement of unfolding the roof, when it is to be closed over the passenger compartment).

It is also to be noted that during folding, the sliding of the arm 45 along the two runners 53 and 57 engenders the downward displacement of the arm 49 which, in combination with the articulation 41, provokes the sloping of the element 17 along F2, this concomitantly with the downward and backward pivoting of the two elements 15 and 17, the element 15 here being driven by the intermediary organs 63 and 65 provided in this embodiment as in the first embodiment.

Still in FIG. 5, it is to be noted once again that the mechanism was designed so that, when the roof is completely stowed in the vertical position inside the space 5, the two elements 15 and 17 are just one in front of the other, the rear element 17 having returned to its "normal" non-sloping position.

From the above and the illustrations, it is to be understood that in the two illustrated embodiments the pivoting means 37 and 39 transfer to the movable roof elements 15 and 17 a curvilinear movement substantially developing between the vertical and the horizontal, with a concavity oriented towards a zone 90 globally located in the vicinity of the front upper part of the stowage space 5 thus allowing to best attain the sought after compact stowing.

It is also to be noted the reduced lateral and axial (along XX') encumbrance of the tipping means 37 and 39 whose constituting elements are advantageously located in the immediate vicinity of the side walls of the bodywork where they articulate, preferably within the dimensions of the space 5 in the direction of the axis XX', that meaning considerably to the rear of the second roof element 17, solely between the rear of seats 7 and the front of the zone 9 which can thus be entirely reserved for housing the engine.

The invention claim is:

1. A convertible vehicle with a longitudinal axis, a front and a rear, and comprising:
   a structure;
   a passenger compartment fitted with seats;
   a retractable rigid roof movable between a closed state and an open state in which the passenger compartment is respectively covered thereby and uncovered, the roof comprising a first roof element and a second roof element located behind the first roof element, in the closed roof state;
   a roof stowage space for stowing the roof in its open state, the space being located behind the seats,
   first displacement means to bring the first and second roof elements side by side, during the opening of the roof;
   second tipping means to displace, via tipping, the first and second roof elements between said closed roof state and the open roof state in which said elements are stowed substantially vertically in the stowage space;
   wherein the second tipping means comprise, laterally, on each side of the roof, a first and a second bent arms offset with respect to each other along said longitudinal axis (XX') of the vehicle and attached in an articulated manner at an end to the second roof element and at another end to the bodywork of the vehicle, one of said bent arms being connected to the first roof element in order to, during the folding of the roof, tip, downwards and backwards, the second roof element which drives along with it the first roof element to which it is therefore attached and thus provokes an elevation of at least the front edge of this second roof element, prior to the relative displacement of said first and second roof elements so as to bring them side by side,
   wherein laterally, on each side of the roof, said first bent arm is attached to the second roof element further to the rear in relation to the second bent arm which itself is attached to the bodywork of the vehicle further to the rear in relation to the first bent arm, the connections of the first and second bent arms to the bodywork of the vehicle being located towards the top and front of the stowage space, and,
   wherein the movements applied to the roof via the first displacement means and the second tipping means are coordinated so that the first roof element is passing under the second roof element, until it comes along side the latter, whilst the second tipping means, connected at an end to the roof elements and at another end to the bodywork of the vehicle, tip this second roof element while bringing the first roof element with it, by means of said first displacement means which connect first and second roof elements together.

2. The vehicle according to claim 1, wherein the second tipping means are connected to the roof towards the rear end of the second roof element and are connected to the first roof element via rods belonging to the displacement means.

3. The vehicle according to claim 1, wherein the second roof element is connected, towards the rear and in an articulated manner, to the second tipping means which, in a movement in relation to the bodywork of the vehicle, drive said roof elements along a curvilinear displacement, with a concavity oriented towards a zone located in the vicinity of the upper front edge of the stowage space.

4. A convertible vehicle with a longitudinal axis, a front and a rear, and comprising:
   a structure;
   a passenger compartment fitted with seats;
   a retractable rigid roof movable between a closed state and an open state in which the passenger compartment is respectively covered thereby and uncovered, the roof comprising a first roof element and a second roof element located behind the first roof element, in the closed roof state;
   a roof stowage space for stowing the roof in its open state, the space being located behind the seats,
   first displacement means to bring the first and second roof elements side by side, during the opening of the roof;
   second tipping means to displace, via tipping, the first and second roof elements between said closed roof state and the open roof state in which said elements are stowed substantially vertically in the stowage space;
   wherein the second tipping means comprise, laterally, on each side of the roof, a first and a second bent arms offset with respect to each other along said longitudinal axis (XX') of the vehicle and attached in an articulated manner at an end to the second roof element and at another end to the bodywork of the vehicle, one of said bent arms being connected to the first roof element in order to, during the folding of the roof, tip, downwards and backwards, the second roof element which drives along with it the first roof element to which it is therefore attached and thus provokes an elevation of at least the front edge of this second roof element, prior to the relative displacement of said first and second roof elements so as to bring them side by side, wherein the first displacement means comprise a slide attached to the first roof element and mounted in a sliding manner in a runner, which is solidly attached to one of the bent arms in order to connect it to the first roof element and drive the latter when the second roof element tips, and, wherein the movements applied to the roof via the first displacement means and the second tipping means are coordinated so that the first roof element is passing under the second roof element, until it comes along side the latter, whilst the second tipping means, connected at an end to the roof elements and at another end to the bodywork of the vehicle, tip this second roof element while bringing the first roof element with it, by means of said first displacement means which connect first and second roof elements together.

5. The vehicle according to claim 4, wherein the second tipping means are connected to the roof towards the rear end of the second roof element and are connected to the first roof element via rods belonging to the displacement means.

6. The vehicle according to claim 4, wherein the second roof element is connected, towards the rear and in an articulated manner, to the second tipping means which, in a movement in relation to the bodywork of the vehicle, drive said roof elements along a curvilinear displacement, with a concavity oriented towards a zone located in the vicinity of the upper front edge of the stowage space.

* * * * *

UNITED STATES PATENT AND TRADEMARK OFFICE
CERTIFICATE OF CORRECTION

| | | |
|---|---|---|
| PATENT NO. | : 7,296,843 B2 | Page 1 of 1 |
| APPLICATION NO. | : 10/558969 | |
| DATED | : November 20, 2007 | |
| INVENTOR(S) | : Gerard Queveau et al. | |

It is certified that error appears in the above-identified patent and that said Letters Patent is hereby corrected as shown below:

On the Title page, section (73) Assignee: Correct the spelling of Assignee's name from "Society Europeene de Brevet Automobiles" to --Société Européenne de Brevets Automobiles--.

Signed and Sealed this

Fifteenth Day of July, 2008

JON W. DUDAS
*Director of the United States Patent and Trademark Office*